United States Patent [19]
Tseng et al.

[11] Patent Number: 5,815,759
[45] Date of Patent: Sep. 29, 1998

[54] EXTENDED ADJUSTING MECHANISM FOR THE LENS SET OF AN IMAGING SYSTEM

[75] Inventors: Kou-Long Tseng, Hsinchu; Chien-Chin Chan, ChuPei; Guang-Shang Chang, Taichung; Chin-Shui Lin, YungHo; Chih-Wen Pan, Taipei; Chi-Wen Lin, Hsinchu, all of Taiwan

[73] Assignee: Umax Data System, Hsinchu, Taiwan

[21] Appl. No.: 48,956

[22] Filed: Mar. 26, 1998

[51] Int. Cl.[6] .................................................. G03B 17/02
[52] U.S. Cl. .......................... 396/541; 348/374; 348/376
[58] Field of Search .................................... 396/348, 349, 396/350, 535, 541; 348/376, 375, 373, 369, 335, 340, 374; D16/211, 213; 358/906, 909.1

[56] References Cited

U.S. PATENT DOCUMENTS

| | | | |
|---|---|---|---|
| 4,493,542 | 1/1985 | Ohmura et al. | 396/541 |
| 5,043,822 | 8/1991 | Ichyosi et al. | 348/376 X |
| 5,233,426 | 8/1993 | Suzuki et al. | 348/373 X |
| 5,442,453 | 8/1995 | Takagi et al. | 348/374 X |

*Primary Examiner*—W. B. Perkey
*Attorney, Agent, or Firm*—W. Wayne Liauh

[57] ABSTRACT

An extended adjusting mechanism for the lens set of an imaging system, which utilizes motion connection means between the main body and the lens set of the imaging system to enlarge the view scope of the imaging system, comprises the lens set for viewing and recording and a connection carrier located at one side of the main body. The connection carrier, which is a carrier for the lens set, further comprises a base connected rotationally to the main body and a dumb-bell connection as a motion junction means between the base and the lens set.

14 Claims, 6 Drawing Sheets

EXTENDED ADJUSTING MECHANISM FOR THE LENS SET OF AN IMAGING SYSTEM

BACKGROUND OF THE INVENTION (1) Field of the Invention

The invention relates to an extended adjusting mechanism for the lens set of an imaging system, and more particularly to which can make the view scope of the lens set versatile by utilizing a hollow dumb-bell or the like connection means between the lens set and the body of the imaging system; such as a stationary camera, a video recorder, or any the like.

(2) Description of the Prior Art

Conventionally, the lens set for an imaging system, such as a stationary camera and a video recorder, is constructed fixedly to the main body of the imaging system. Such an arrangement only allows the lens set to rotate or elongate along its central axis, and will limit the view scope and operational versatility of the imaging system. Especially in a working area which only provides limited space or where the object is obscure in viewing, the imaging difficulty is raised to some extent.

To overcome aforesaid shortcoming of the conventional imaging system, few work appear to provide better object viewing capacity of the lens set. As shown in FIG. 1, the imaging system comprises a first main body 1 and a first lens set 11 connected rotationally to side of the first main body 1 by a shaft in between. By means of the shaft (not shown in FIG. 1), the first lens set 11 is capable of rotation to an extend of about 270 degree.

Shown in FIG. 2, another imaging system comprises a second main body 2 and a second lens set 21 connected rotationally at a corner of the second main body 2 by a shaft as a rotation axis for the second lens set 21. By means of the shaft (not shown in FIG. 2), the second lens set 21 is adjustable by rotating the second lens set 21.

Apparently in the aforesaid description of two prior art, both the first lens set 11 and the second lens set 21 have only one rotation axis, i.e. possessing only one rotation degree of freedom. In future application, it can be expected that the lens set with a single degree of freedom no longer meets the complicated working environment and is hard to satisfy the convenience requirement.

Therefore, an invention devoting to resolving aforesaid disadvantages of conventional adjusting mechanism for the lens set of an imaging system is necessary, definitely.

SUMMARY OF THE INVENTION

Accordingly, it is a primary object of the present invention to provide an extended adjusting mechanism for the lens set of an imaging system, which will make broader its view scope and increase the operational convenience.

It is another object of the present invention to provide an extended adjusting mechanism for the lens set of an imaging system, which increases the degree of freedom of the lens set by utilizing a simple dumb-bell connection to replace the conventional rotation shaft connection.

It is a further object of the present invention to provide an extended adjusting mechanism for the lens set of an imaging system, which makes the application of the lens set more versatile by increasing its degree of freedom.

The extended adjusting mechanism for the lens set of an imaging system in accordance with the present invention, which is applied to stationary cameras, video recorders, and the like, utilizes motion connection means between the main body and the lens set to enlarge the view scope of the imaging system, and comprises a lens set and a connection carrier.

According to the present invention, the lens set which is a photo-taking unit further comprises a front lens, a photo filter, a charge coupled device, necessary circuit board and wiring.

According to the invention, the connection carrier, which is located to one side of main body of the imaging system as a carrier for the lens set, further comprises a base and a dumb-bell connection located on top of the base. The base is connected with the main body either fixedly, or by a hollow pivot shaft, or even the base is an extruding portion of the main body of the imaging system. By providing the pivot shaft, the base can rotate at the side of the main body.

The dumb-bell connection, which is located on top of the base as a junction means between the base and the lens set, is a hollow fix-length or extendible bar with ball joints at one or both ends. The hollow interior of the dumb-bell connection is used for accommodating communication cables. By providing the ball joint for joining the dumb-bell connection and the lens set, the lens set then is capable of three rotation degrees of freedom.

According to the present invention, the base can further have one dumb-bell housing located on top of the base to provide a compatible space for receiving the dumb-bell connection. By providing the dumb-bell housing, the lens set can be pulled back to sit on top of the base for storage, by resting the dumb-bell connection into the dumb-bell housing.

In another embodiment according to the present invention, the third base can be a half-cylindrical profile, with its curve surface located farther than any other surface of the base with the main body, and further including a slot on the curve surface to allow the dumb-bell connection penetrating into the base and pivotedly anchoring inside the base. By providing the slot, the dumb-bell connection can then be rotated up and down along the slot direction.

In a further embodiment of the extended adjusting mechanism for the lens set of an imaging system according to the present invention, the base further includes a dumb-bell connection well insides and a retractable dumb-bell connection to allow the lens set resting on top of the base and having the dumb-bell connection retracted within the dumb-bell connection well.

All these objects are achieved by the extended adjusting mechanism for the lens set of an imaging system described below.

BRIEF DESCRIPTION OF THE DRAWINGS

The present invention will now be specified with reference to its preferred embodiments illustrated in the drawings, in which.

DESCRIPTION OF THE PREFERRED EMBODIMENTS

The invention disclosed herein is directed to an extended adjusting mechanism for the lens set of an imaging system. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

The extended adjusting mechanism for the lens set of an imaging system in accordance with the present invention relates to an extended adjusting mechanism for the lens set of an imaging system, and more particularly to which the mechanism can make the view scope of the lens set enlarged and adjustable by utilizing a hollow dumb-bell or the like connection means between the lens set and the body of the imaging system; such as a stationary camera, a video recorder, or any the like.

According to the present invention, the extended adjusting mechanism for the lens set of an imaging system comprises a lens set and a connection carrier. The lens set for photo-taking further comprises a front lens, a photo filter, a charge coupled device, necessary circuit board and wiring, and any for the lens set to complete the viewing and recording functions. The connection carrier, which is located to one side of main body of the imaging system as a carrier for the lens set, further comprises a base and a dumb-bell connection located on top of the base.

The base of the connection carrier can be fixedly connected with the main body of the imaging system, formed as an extension portion of the main body, or connected rotationally with the main body by a hollow pivot shaft; where the hollow interior of the pivot shaft can be used for accommodating the communication cables. By providing the pivot shaft, the base can have a rotation degree of freedom, and then can rotate at the side of the main body along the pivot shaft.

The dumb-bell connection, which is located on top of the base as a junction means between the base and the lens set, is a hollow bar with fixed or extendible bar length and with ball joints at one or both ends of the bar. The hollow interior of the dumb-bell connection is used for accommodating communication cables. By providing the ball joint to join the dumb-bell connection and the lens set, the lens set then has three rotation degrees of freedom, and thus has a spherical accessible viewing scope with the lens set as the center. Furthermore, it is well understood that the construction of the ball joint need to have an aperture for the cables extruding out of the dumb-bell connection and connecting to the lens set.

Figure 1:
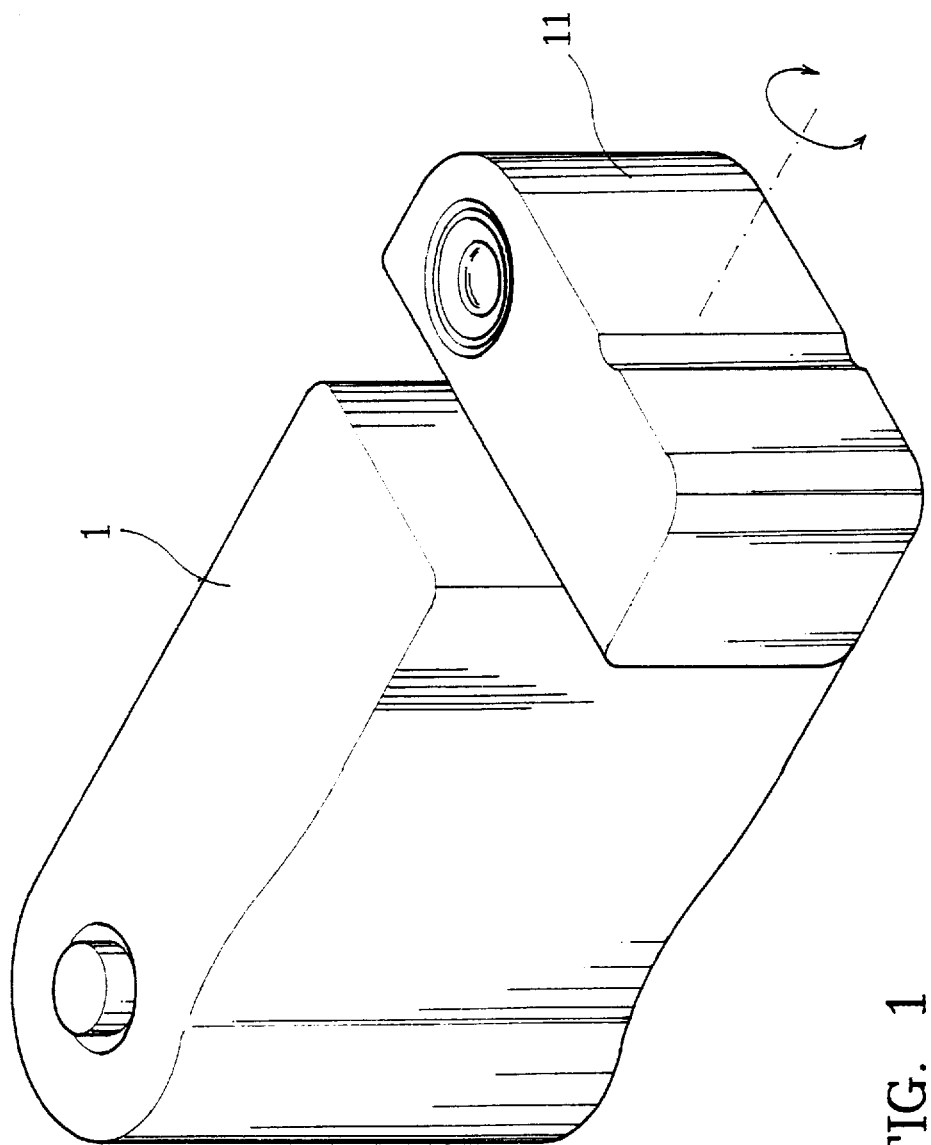
FIG. 1 is a perspective view of an imaging system with a rotational lens set.
Figure 2:
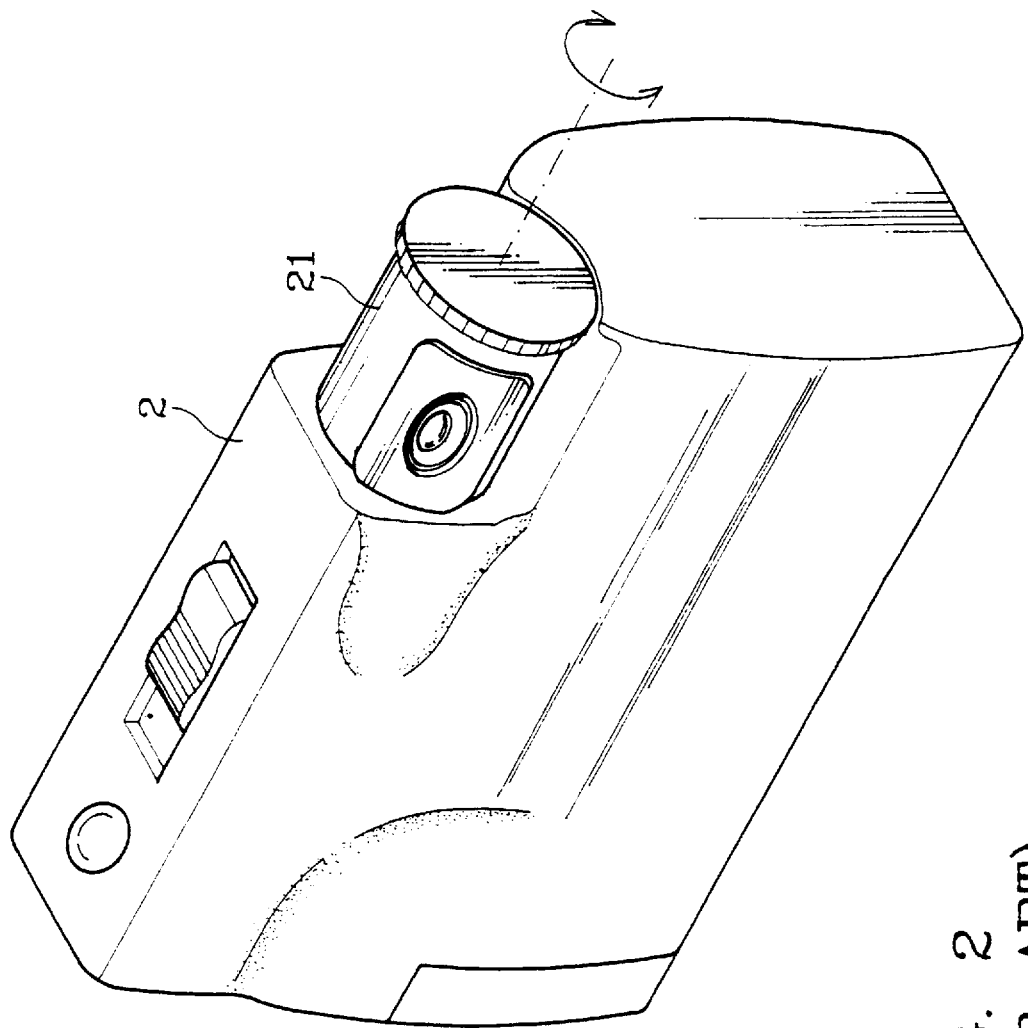
FIG. 2 is a perspective view of another imaging system with a rotational lens set.
Figure 3:
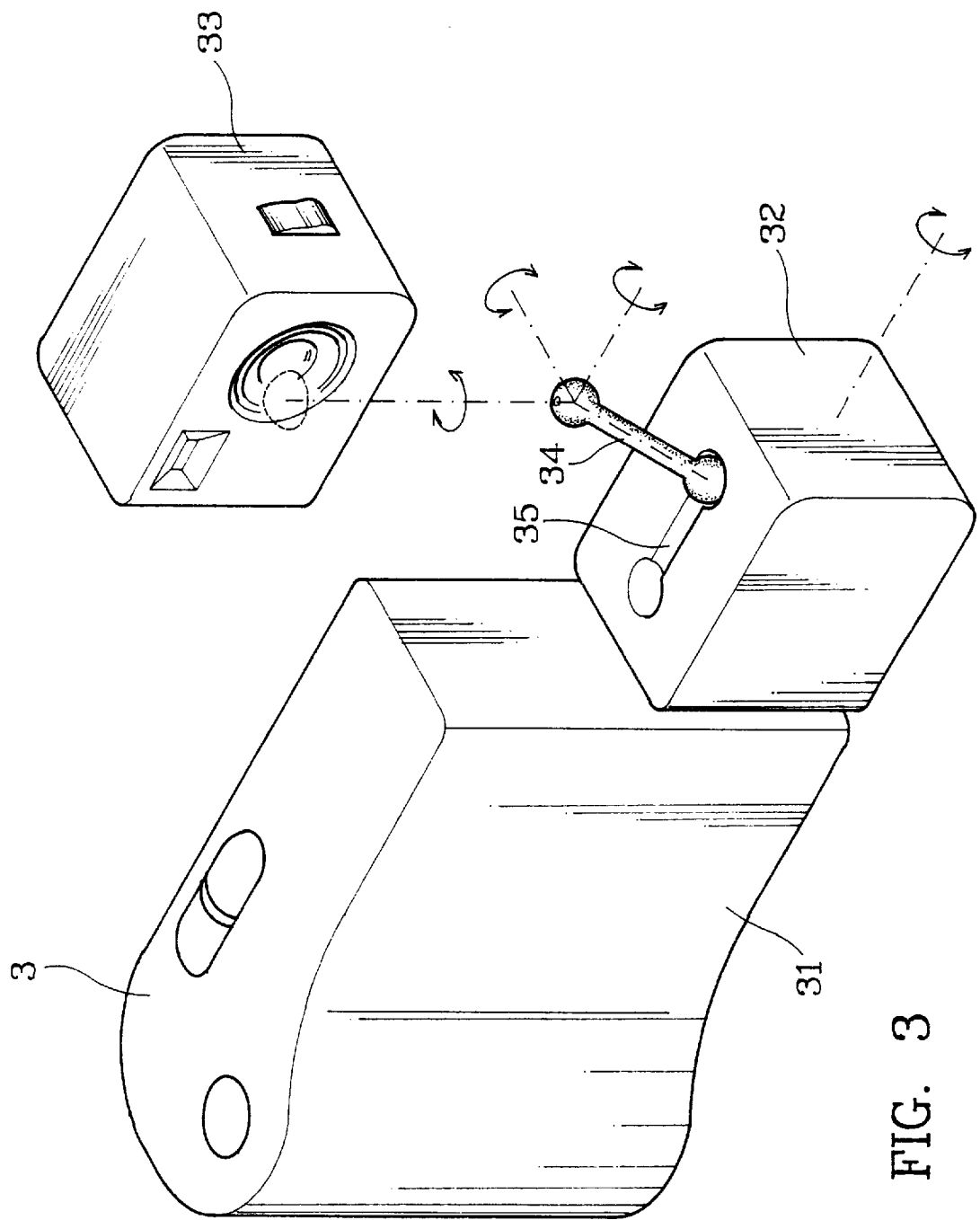
FIG. 3 is a perspective view of the first embodiment of the extended adjusting mechanism for the lens set of an imaging system in accordance with the present invention.

Now referring to FIG. 3, the first embodiment 3 of the extended adjusting mechanism for the lens set of an imaging system according to the present invention is shown. In the first embodiment 3, the first main body 31 and the first base 32 of the connection carrier are connected rotationally by a hollow pivot shaft (not shown in the figure), where the hollow interior of the pivot shaft can be used for accommodating the communication cables. On top of the first base 32, a concave first dumb-bell housing 35 is constructed to provide a storage room for the first dumb-bell connection 34.

The first dumb-bell connection 34 is a hollow bar connecting the first base 32 and the first lens set 33 at both ends, and with one ball joint at each end. The ball joints at both ends of the first dumb-bell connection 34 are utilized to provide the capability of spatial rotation between the first dumb-bell connection 34 and the first base 32, as well as between the first dumb-bell connection 34 and the first lens set 33. By providing the rotational first base 32, the first dumb-bell connection 34 and the ball joints, the first lens set 33 can then be raised over the first base 32 and adjustable to any viewing angle. By providing the first dumb-bell housing 35, the first dumb-bell connection 34, and the ball joint in between, the first lens set 33 can then be pulled back to rest right on top of the first base 32 for storage.

Figure 4:
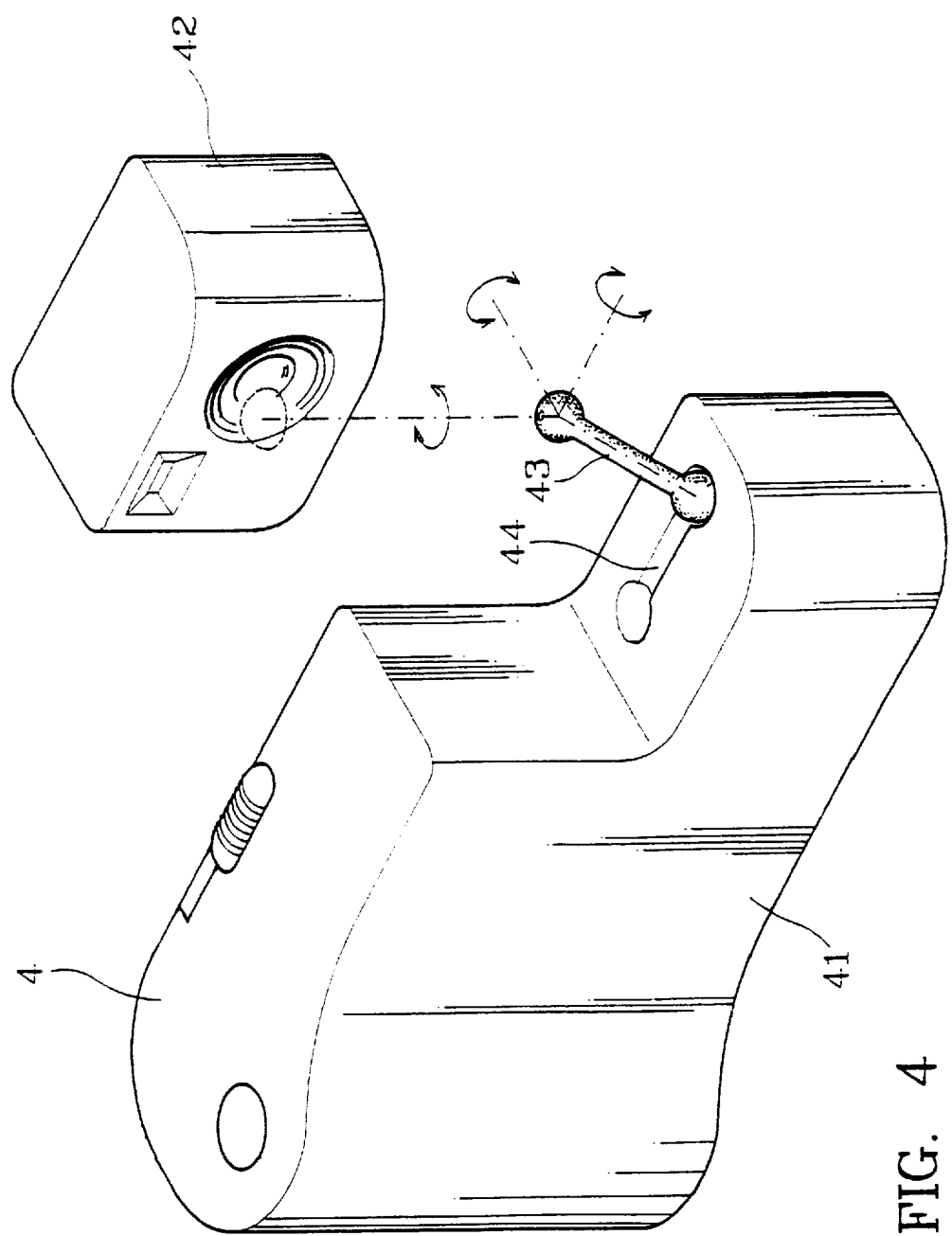
FIG. 4 is a perspective view of the second embodiment of the extended adjusting mechanism for the lens set of an imaging system in accordance with the present invention.

Referring now to FIG. 4, the second embodiment 4 of the extended adjusting mechanism for the lens set of an imaging system according to the present invention is shown. In the second embodiment 4, the base of the connection carrier is formed as an extruding portion of the second main body 41. On top of the base, a concave second dumb-bell housing 44 is constructed to provide a storage room for the second dumb-bell connection 43. The second dumb-bell connection 43 is a hollow bar connecting the base and the second lens set 42 at both ends, and with one ball joint at each end. The ball joints at both ends of the second dumb-bell connection 43 are utilized to provide the capability of spatial rotation between the second dumb-bell connection 43 and the base, as well as between the second dumb-bell connection 43 and the second lens set 42. By providing the second dumb-bell connection 43 and the ball joints, the second lens set 42 can then be raised over the base and adjustable to any viewing angle. By providing the second dumb-bell housing 44, the second dumb-bell connection 43, and the ball joint in between, the second lens set 42 can then be pulled back to rest right on top of the base for storage.

Compared to the first embodiment 3 shown in FIG. 3, the second embodiment 4 is short of a rotation degree of freedom at the conjunction between the base and the second main body 41.

Figure 5:
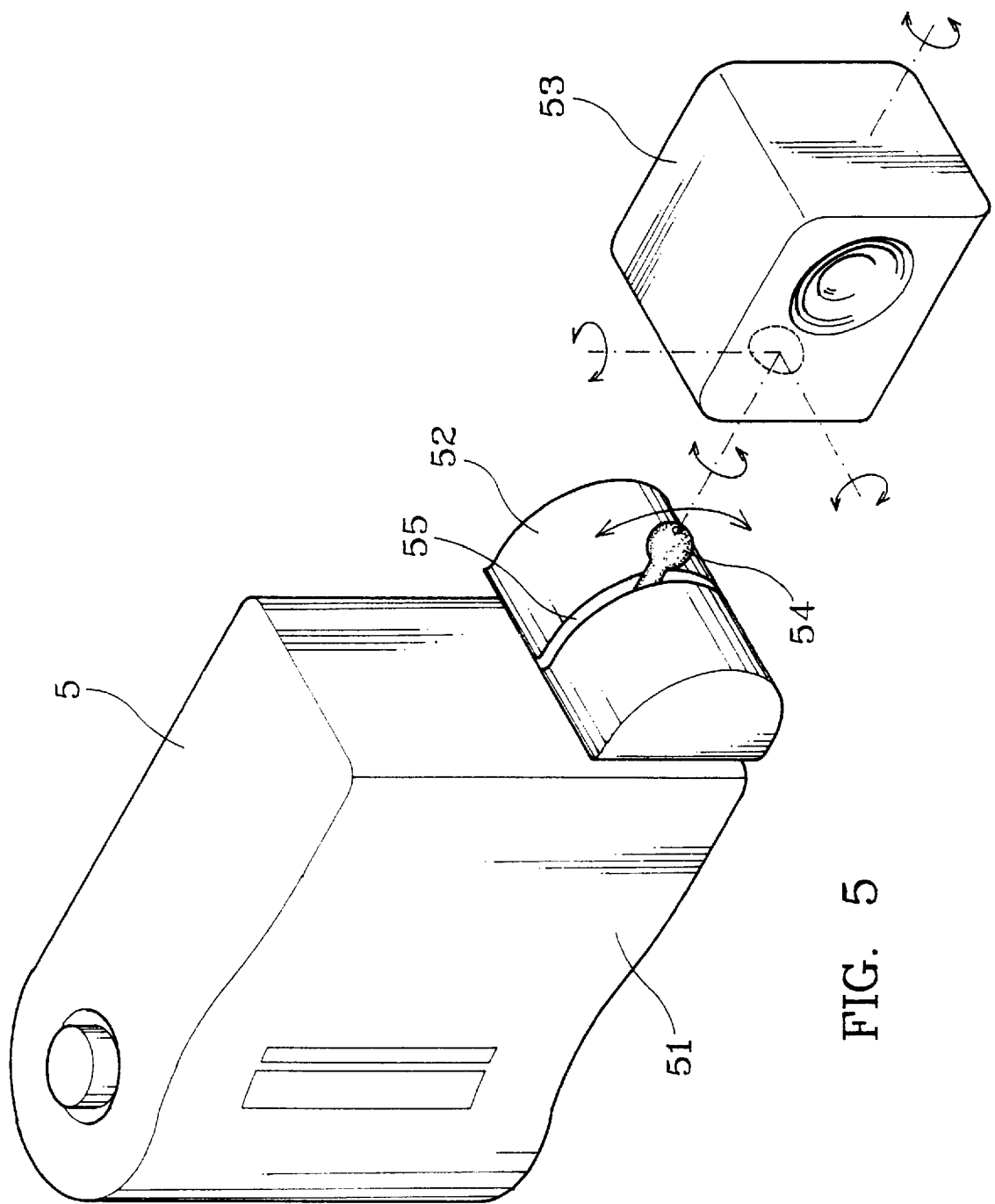
FIG. 5 is a perspective view of the third embodiment of the extended adjusting mechanism for the lens set of an imaging system in accordance with the present invention.

Now referring to FIG. 5, the third embodiment 5 of the extended adjusting mechanism for the lens set of an imaging system according to the present invention is shown. In the third embodiment 5, the third main body 51 and the third base 52 of the connection carrier are connected rotationally by a hollow pivot shaft (not shown in the figure), where the hollow interior of the pivot shaft can be used for accommodating the communication cables. The third base 52 has a half-cylindrical profile, with its curve surface located farther than any other surface of the third base 52 with the third main body 51. The third base 52 further includes a slot 55 on the curve surface to allow the third dumb-bell connection 54 penetrating into the third base 52 and pivotedly anchoring inside the third base 52. On the other end of the third dumb-bell connection 54, a ball joint is utilized to connect the third lens set 53 and the third dumb-bell connection 54 and to provide the capability of spatial rotation between the third dumb-bell connection 54 and the third lens set 53. According to the present invention, the third dumb-bell connection 54 is a hollow bar connecting the third base 52 and the third lens set 53 at both ends. By providing the rotational third base 52, the third dumb-bell connection 54 and the ball joint, the third lens set 53 can then be raised up and down along the slot 55 direction and adjustable to any viewing angle.

Figure 6:
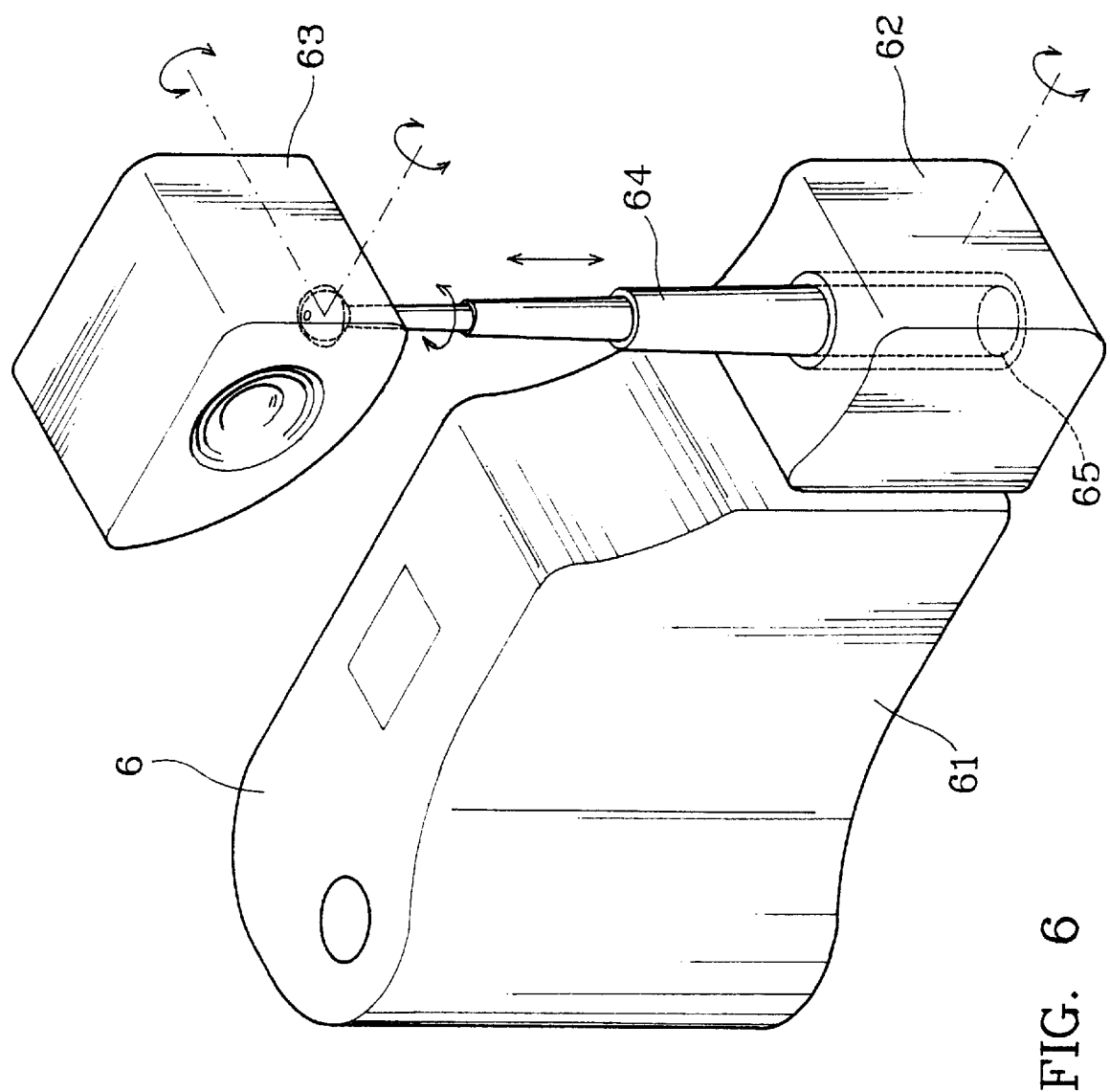
FIG. 6 is a perspective view of the fourth embodiment of the extended adjusting mechanism for the lens set of an imaging system in accordance with the present invention.

Now referring to FIG. 6, the fourth embodiment 6 of the extended adjusting mechanism for the lens set of an imaging system according to the present invention is shown. In the fourth embodiment 6, the fourth main body 61 and the fourth base 62 of the connection carrier are connected rotationally by a hollow pivot shaft (not shown in the figure), where the hollow interior of the pivot shaft can be used for accommodating the communication cables. The fourth base 62 further includes a fourth dumb-bell connection well 65 insides, and the fourth dumb-bell connection well 65 has an aperture on the surface of the fourth base 62 to allow the fourth dumb-bell connection 64 resting within the fourth dumb-bell connection well 65. The fourth dumb-bell connection 64 is a multiple-section retractable hollow bar connecting the fourth base 62 and the fourth lens set 63 at both ends. A ball joint is utilized to connect the fourth lens set 63 and the fourth dumb-bell connection 64 and to provide the capability of spatial rotation between the fourth dumb-bell connection 64 and the fourth lens set 63. By providing the rotational fourth base 62, the fourth dumb-bell connection 64 and the fourth lens set 63 can be rotated as an assembly. By providing the retractable fourth dumb-bell connection 64 and the fourth dumb-bell well 65, the fourth lens set 63 can be raised and rest on top of the fourth base 52. By providing the ball joint between the fourth dumb-bell connection 64 and the fourth lens set 63, the third lens set 53 can then be adjustable to any viewing angle.

While the present invention has been particularly shown and described with reference to preferred embodiments, it will be understood by those skilled in the art that various changes in form and detail may be without departing from the spirit and scope of the present invention.

We claim:

1. An extended adjusting mechanism for the lens set of an imaging system, which is applied to one side of the main body of said imaging system, comprising:

a lens set for viewing and recording; and a connection carrier, which is located to said side of said main body of said imaging system as a carrier for said lens set, further comprising:

a base, which is a carrier block connected rotationally to said side of said main body by a hollow pivot shaft; and a dumb-bell connection as a junction means between said base and said lens set, which is a hollow bar with a ball joint at one end whichof connecting to said lens set.

2. The extended adjusting mechanism for the lens set of an imaging system according to claim 1, wherein said dumb-bell connection is connected with a pivot shaft located inside said base, which said base further comprises a slot on the surface whichof to allow said dumb-bell connection penetrating into said base.

3. The extended adjusting mechanism for the lens set of an imaging system according to claim 2, wherein said base has a half-cylindrical profile, with the curve surface whichof located farther than any other surface of said base and with said slot located on said curve surface.

4. The extended adjusting mechanism for the lens set of an imaging system according to claim 1, wherein said dumb-bell connection is rotationally connected with said base via a ball joint located between one end of said dumb-bell connection and top of said base.

5. The extended adjusting mechanism for the lens set of an imaging system according to claim 4, wherein said base further comprises a concave dumb-bell housing on said top whichof to provide a storage room for said dumb-bell connection.

6. The extended adjusting mechanism for the lens set of an imaging system according to claim 1, wherein said dumb-bell connection is a retractable hollow bar connecting said base and said lens set.

7. The extended adjusting mechanism for the lens set of an imaging system according to claim 6, wherein said base further comprises a dumb-bell connection well located inside whichof, where said dumb-bell connection well has an aperture on the surface of said base to allow said dumb-bell connection resting within said dumb-bell connection well.

8. An extended adjusting mechanism for the lens set of an imaging system, which is applied to one side of the main body of said imaging system, comprising:

a lens set for viewing and recording; and a connection carrier, which is located to said side of said main body of said imaging system as a carrier for said lens set, further comprising:

a base, which is a carrier block connected fixedly to said side of said main body; and a dumb-bell connection as a junction means between said base and said lens set, which is a hollow bar with a ball joint at one end whichof connecting to said lens set.

9. The extended adjusting mechanism for the lens set of an imaging system according to claim 8, wherein said dumb-bell connection is connected with a pivot shaft located inside said base, which said base further comprises a slot on the surface whichof to allow said dumb-bell connection penetrating into said base.

10. The extended adjusting mechanism for the lens set of an imaging system according to claim 9, wherein said base has a half-cylindrical profile, with the curve surface whichof located farther than any other surface of said base and with said slot located on said curve surface.

11. The extended adjusting mechanism for the lens set of an imaging system according to claim 8, wherein said dumb-bell connection is rotationally connected with said base via a ball joint located between one end of said dumb-bell connection and top of said base.

12. The extended adjusting mechanism for the lens set of an imaging system according to claim 11, wherein said base further comprises a concave dumb-bell housing on said top whichof to provide a storage room for said dumb-bell connection.

13. The extended adjusting mechanism for the lens set of an imaging system according to claim 8, wherein said dumb-bell connection is a retractable hollow bar connecting said base and said lens set.

14. The extended adjusting mechanism for the lens set of an imaging system according to claim 13, wherein said base further comprises a dumb-bell connection well located inside whichof, where said dumb-bell connection well has an aperture on the surface of said base to allow said dumb-bell connection resting within said dumb-bell connection well.

* * * * *